United States Patent [19]

Takizawa

[11] Patent Number: 4,977,973
[45] Date of Patent: Dec. 18, 1990

[54] HEADREST CONTROL DEVICE AND HEADREST DRIVE MECHANISM FOR USE IN AN AUTOMOTIVE SEAT

[75] Inventor: Kiyotaka Takizawa, Akishima, Japan

[73] Assignee: TACHI-S Co., Ltd., Tokyo, Japan

[21] Appl. No.: 386,922

[22] Filed: Jul. 31, 1989

[30] Foreign Application Priority Data

Aug. 24, 1988 [JP] Japan .................. 63-210046

[51] Int. Cl.⁵ .......................................... B60R 21/055
[52] U.S. Cl. .................................. 180/271; 280/751; 297/408
[58] Field of Search ............... 280/751, 753; 180/271; 297/403, 408, 410

[56] References Cited

U.S. PATENT DOCUMENTS 4,807,934  2/1989  Sakakibara et al. ............... 297/403
4,834,456  5/1989  Barros et al. ....................... 297/403

FOREIGN PATENT DOCUMENTS 3136648  3/1983  Fed. Rep. of Germany ...... 297/408
3332729  3/1985  Fed. Rep. of Germany ...... 297/403
3545142  6/1987  Fed. Rep. of Germany ...... 297/403
 128842  6/1987  Japan ................................... 297/403
2106380  4/1983  United Kingdom ............... 297/403

Primary Examiner—Charles A. Marmor
Assistant Examiner—Tamara L. Finlay
Attorney, Agent, or Firm—Browdy and Neimark

[57] ABSTRACT

A headrest control device and a headrest drive mechanism for use with an automotive rear seat are disclosed. In the headrest control device, it is determined whether an occupant is present or absent in a rear seat and, if no occupant is detected, then, in linkage with gear change to reverse, the headrest of the rear seat is rotated forwardly and downwardly from its support position to its storage position situated below the backward field of view line of the driver, so that a good backward visual field can be secured for the driver in backing the car.

5 Claims, 3 Drawing Sheets

HEADREST CONTROL DEVICE AND HEADREST DRIVE MECHANISM FOR USE IN AN AUTOMOTIVE SEAT

BACKGROUND OF THE INVENTION

1. Field of the Invention

The present invention relates to a headrest control device and headrest drive mechanism for use in an automotive seat which are capable of moving the headrest of a rear seat in connection with changing to a reverse gear for the backing of a car to thereby obtain a good backward field of vision for the driver.

2. Description of the Prior Art

For example, when a conventional headrest is mounted to the top of a rear seat, the headrest does not offer a very substantial obstacle in the normal driving of a car. However, when backing the car, the headrest disposed on the upper end of a seat back of the rear seat obstructs the backward visual range of a driver, that is it provides a visual obstacle to the most convenient backing of the car.

In view of the above, there has been proposed a headrest control system in which the headrest is moved from its support position to a position below the driver's backward field of view when shifting to reverse, and the headrest remains retracted. According to this headrest control system interlocked with the gear change, because the headrest of the rear seat remains stored at a position below the driver's field of view when he or she is backing a car, the driver can back the car without his or her vision being obstructed by the rear seat headrest.

However, in the above-mentioned known headrest control system interlocked with engagement of the reverse gear, if the gear is shifted to reverse, then, whether an occupant is present in the rear seat or not, the headrest in the rear seat is immediately moved to a position below the driver's backward field of view and stays there.

Also, most of the time, the headrest is mounted to the upper end portion of the seat back through a stay in such a manner that it can be moved in a vertical direction and the headrest can be stored in a recess-like storage space formed in the upper end portion of the rear seat back. This limits the shapes of the headrest and the quality of the appearance of the rear seat back is lowered due to such recess being formed in the rear seat back. In particular the appearance is poor when the headrest is raised up to its support position for use because the storage space in the upper end portion of the headrest is exposed and the unattractive stay is clearly visible.

SUMMARY OF THE INVENTION

The present invention aims at eliminating the drawbacks found in the above-mentioned conventional headrest control system.

Accordingly, it is an object of the invention to provide a headrest control device which is capable of controlling the storage of a headrest when a gear is changed responsive to the presence or absence of an occupant in a rear seat.

In order to attain the above object, according to one aspect of the invention there is provided a headrest control device linked with gear change in which means are provided to check whether an occupant is present or absent in a rear seat and if it is found that no occupant is present there, then the headrest for the rear seat is rotated forwardly and down from its support position when there is a gear change to the reverse gear. That is, the headrest is moved down to its storage position below the backward field of view of a driver, so that there will be a good backward field of vision for the driver when he/she backs up the car.

Also, according to the invention, it is preferred that the opening of a rear door be detected by suitable means whereby the headrest is returned from its storage position back to its support position if the rear door is opened.

It is another object of the invention to provide suitable means so as not to prevent an occupant from climbing into a rear seat even when the headrest is in its storage position.

In achieving this objective, according to another aspect of the invention, there is provided a door sensing means in a rear door which can sense the opening of the rear door, whereby when this happens the headrest is returned from its storage position back to its support position simultaneously with the opening of the rear door.

It is still another object of the invention to be able to set the forward and backward positions of a headrest according to the tastes of occupants.

To accomplish this object, according to still another aspect of the invention, there is provided a manual switch; by operating the manual switch, the headrest can be rotationally moved in the forward and backward direction to thereby set the forward and backward positions of the headrest to the occupant's comfort and desired taste.

It is yet another object of the invention to be able to move the headrest from its support position to its storage position when no occupant is present in the rear seat and also when the shift lever is changed to the reverse gear to thereby secure a backward field of view for the driver so that the driver can back the car with the greatest ease.

In order to achieve this object, according to yet another aspect of the invention, there is provided a headrest control device comprising: sitting detection means for detecting the presence or absence of an occupant in a rear seat; reverse gear detection means for detecting the change of a shift lever to the reverse gear; and a central processing unit for processing information input therein in accordance with a predetermined program and for transmitting a control signal to a motor drive circuit to thereby control the driving of a motor so that, when it is detected by the sitting detection means that no occupant is present in the rear seat and it is also detected by the reverse gear detection means that the shift lever has been changed to the reverse gear, the motor is then driven to thereby rotationally move the headrest from its support position to its storage position.

It is a further object of the invention to eliminate the need of formation of a recess-like space in a rear seat back for storage of a headrest as in a conventional rear seat back as mentioned above.

In accomplishing this objective according to a further aspect of the invention, there is provided a headrest drive mechanism which is capable of rotating the headrest in the forward and backward directions. Thus, the headrest drive mechanism eliminates the space for storage of a headrest that is formed in the upper end portion of a rear seat back as in the conventional headrest control device mentioned above, so that the outer appearance of the rear seat back is substantially improved.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
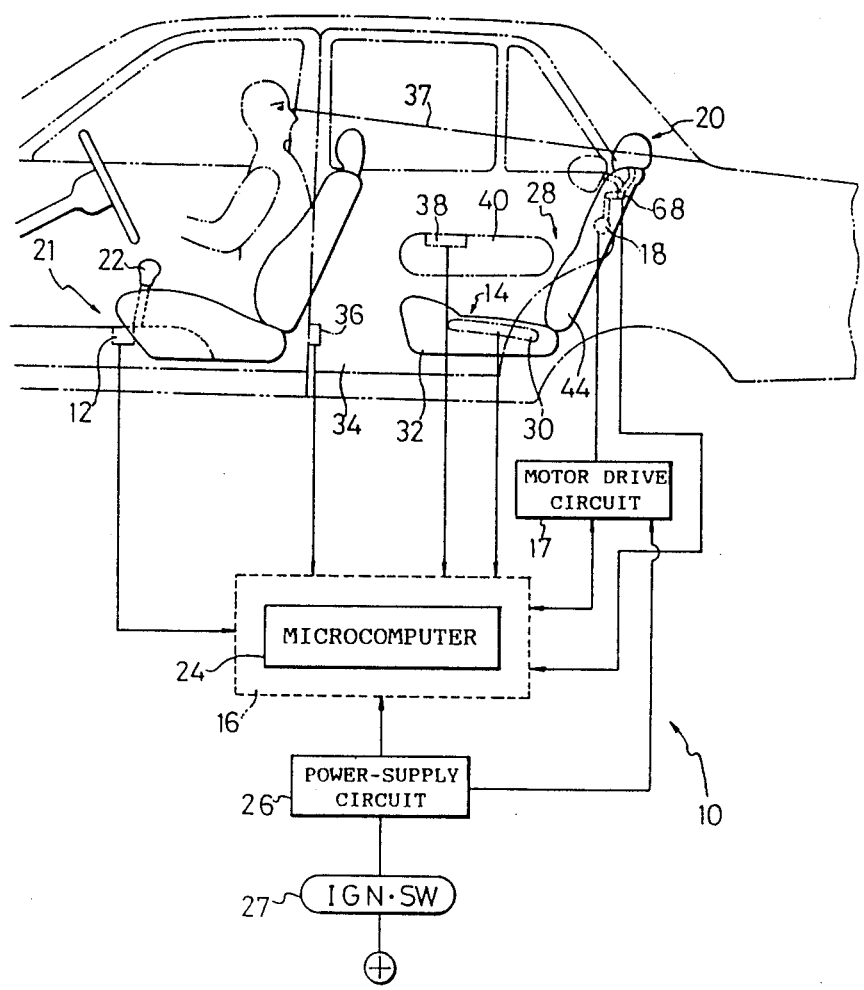
FIG. 1 is a general block diagram of a headrest control device linked with gear change according to the invention.

FIG. 1 is a general block diagram of a headrest control device 10 linked with shifting to reverse according to the invention. As shown in FIG. 1, the headrest control device 10 comprises reverse gear detection means 12, rear seat passenger (or sitting) detection means 14, a central processing unit 16 and a headrest positioning motor 18 for controlling the position of a headrest 20. The motor 18 can be, for example, a DC motor. If the motor is operated, then the headrest 20 is rotated between its support and storage positions and, in its support position the headrest 20 supports the head of a rear seat passenger in the usual way (see FIG. 2).

The reverse gear detection means 12 can be disposed, for example, in the transmission box 21 and is adapted to detect the change of the shift lever 22 to the reverse gear. As the reverse gear detection means 12, for example, the reverse gear switch (not shown) may be used which can be turned on by changing the shift lever 22 to the reverse position. However, this is not limitative and, alternatively, other means can be used to detect the change of the shift lever 22 to the reverse gear. Regardless, when the reverse gear detection means 12 detects the change of the shift lever 22 to the reverse gear, then a signal is transmitted to the central processing unit 16.

The central processing unit 16 includes a microcomputer (micro) 24 which is adapted to process input in accordance with a stored program and to output or transmit a suitable control signal. The control signal is transmitted, for example, to a motor drive circuit 17 to control the driving of the headrest positioning motor 18. For example, in the support position of the headrest 20, if a signal from the reverse gear detection means 12 is transmitted to the central processing unit 16, then the central processing unit 16 transmits a signal to the motor drive circuit 17 to rotate the headrest in the storage direction (reverse rotation), and thus the motor 18 is driven, so that the headrest 20 is rotated from its head support position (FIG. 2) to its storage position (FIG. 3) where it is stored. It should be noted that the motor drive circuit 17 and central processing unit 16 are respectively connected to a power-supply circuit 26 which is in turn connected through an ignition switch 27 to the positive pole of a battery, e.g. the regular auto battery.

Also, the sitting detection means 14 is disposed, for example, in the rear seat 28 and is adapted to detect the presence or absence of an occupant in the rear seat and to transmit a control signal to the central processing unit 16. As the sitting detection means 14 there can be used, for example, a pressure sensitive switch 30 which is disposed in a seat cushion 32 of the rear seat 28. If the pressure sensitive switch 30 detects any predetermined degree of pressure, then a signal is transmitted to the central processing unit 16, whereby the presence of an occupant in the rear seat 28 is detected. The sitting detection means 14 is not limited to a pressure sensitive switch 30, but may comprise a photo sensor or the like. If a signal from the sitting detection means 14 is transmitted to the central processing unit 16 and the presence of the passenger in the rear seat 28 is confirmed by the central processing unit 16 then any operation to store the headrest 20 is prohibited, as will be discussed below. In other words, when the occupant is sitting in the rear seat 28, even if a signal is transmitted from the reverse gear detection means 12 to the central processing unit 16, the headrest 20 will not be moved to the storage position.

Figure 2:
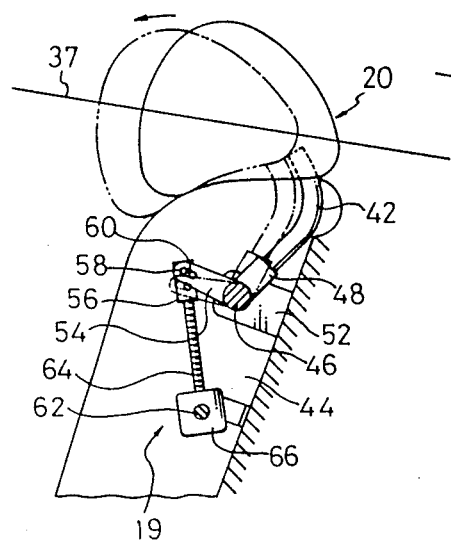
FIG. 2 is a section view of a headrest in its support position, taken along the line II—II in FIG. 4.

Further, according to the invention, the headrest control device 10 includes rear door position sensing means 36 which senses the opening of a rear door 34. As the door position sensing means 36, there may be used a door switch (not shown) for an interior light which turns on simultaneously with the opening of the rear door 34. However, the door position sensing means 36 is not limited to the door switch but other means can instead be used for the door position sensing means 36. Regardless, when a signal from the door position sensing means 36 is transmitted to the central processing unit 16 by means of the opening of the rear door 34, then a signal is transmitted from the central processing unit 16 to the motor drive circuit 17 for rotation of the headrest to the support position (forward rotation). The motor 18 is driven by the forward rotation signal from the central processing unit 16, with the result that the headrest 20 is rotated from its storage position (FIG. 3) to its support position (FIG. 2).

The headrest 20 is arranged such that it is able to support the head of the occupant and also so that it can be rotationally moved back and forth between its support and storage positions respectively shown by a solid line and a one-dot phantom line in FIG. 1. The headrest 20 is able to prevent the backward movement of the occupant's head in its support position in the event of a car crash or in similar accidents. Also, in its storage position the headrest 20 is situated below a so-called backward visual field line or field of view line 37 which connects the eye of a driver with the lower edge of a rear window or the edge of a rear bonnet or trunk, and the driver's backward visual field can be secured due to the movement of the headrest 20 to its storage position.

In the illustrated embodiment as shown in FIG. 1, there is also provided a manual switch 38 for the headrest 20. The manual switch 38 may be constructed in such a manner that it includes a forward movement switch and a rearward movement switch. By operating the manual switch 38, the occupant is able to move the support position of the headrest 20 back and forth, as shown by a one-dot phantom line in FIG. 2 to thereby set his or her support position in any arbitrary desired manner, that is the occupant can perform the fine adjustment of the headrest. As the forward and rearward movement switches of the manual switch 38, there can for example be used a push switch of the return type which returns to its initial position when the pressure applied thereto is removed, or a return-type of seesaw switch which has a neutral position and 2 position contacts. The manual switch 38 can be arranged in a position in which the occupant in the rear seat is able to operate the manual switch with ease, for example in an armrest 40 formed integrally with the inner wall of the rear door 34. However, this positioning is not required and the manual switch 38 can alternatively be disposed in other members such as an armrest which is mounted to the central portion of the rear seat 32.

Figure 4:
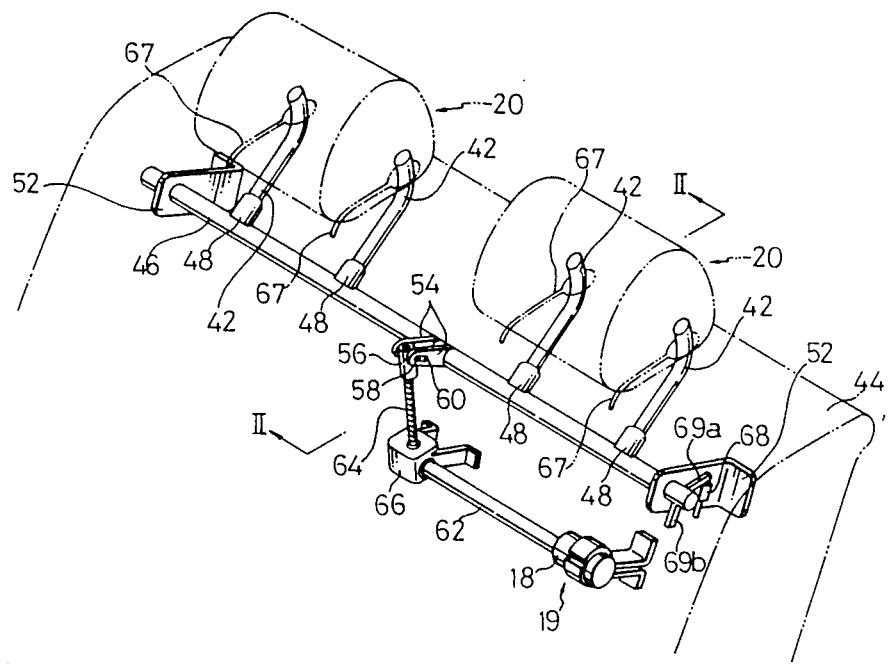
FIG. 4 is a general perspective view of headrests.

The headrest drive mechanism 19 for rotating the headrest 20 is generally constructed in the following manner. The headrest 20, as can be understood from FIGS. 2 and 4, is connected through a pair of stays to a seat back 44. Each of the stays is formed of a pipe or the like and the lower end of the stay is fixed to each of a pair of stay holders 48 respectively secured to a shaft 46. The shaft 46 is rotatably mounted to and between a pair of brackets 52 respectively fixed to the seat back 44. The shaft 46 also includes a pair of links 54 which are respectively fixed to the shaft 46 and are extended therefrom in a direction perpendicular to the axis of the shaft. Between the leading ends of the links there is interposed a rotatable nut 56. The nut 56 includes for example a pair of pins 58 respectively extending out from the two sides thereof. That is, the nut 58 is arranged such that it can be rotated by inserting the pins 58 respectively through a pair of insertion holes 60 respectively formed in the leading end portions of the links 54.

Also, the motor 18, as can be seen from FIG. 4, is fixed to the seat back 44 and is also arranged in such a manner that it can be operated via linkage with a lead screw 64 if its output shaft 62 having a gear in the leading end thereof is brought into engagement with lead screw 64 within a gear box 66. The lead screw 64 is brought into threaded engagement with the nut 56 interposed between the above-mentioned links 54. The nut 56, which is in threaded engagement with the lead screw 64, can be threadedly advanced or retreated in a linear direction as the lead screw 64 is rotated. However, because the leading end portions of the links 54 to which the nut 56 is mounted are rotated about the shaft 46, there is generated a local difference between the linear movement of the nut and the rotational movement of the leading ends of the links. For this reason, it is preferred that the insertion hole 60 for insertion of the pin 58 of the nut 56 be formed as an elongated hole so as to be able to make up for the local difference between the linear and rotational movements of the nut 56 and links 54.

Further, there are formed slits 67 in the upper end portion of the seat back 44, which slits 67 respectively extend in the range of movements of the respective stays 42, so that the respective stays 42 can be inserted into their associated slits 67 and also can be moved back and forth.

In the above-mentioned structure, if a control signal is transmitted from the central processing unit 16 to the motor drive circuit 17 and thus the motor 18 is driven, then the lead screw 64 is rotated by means of the gear box 66 and thus the nut 56 in threaded engagement with the lead screw 64 is threadedly advanced and retreated so that the nut 56 is moved upward and downward. With the threaded advancement and retreatment of the nut 56, the links 54 is rotated together with the shaft 46 to thereby move (rotate) the headrest 20 back and forth. For example, in the support position of the headrest as shown in FIG. 2, if the reverse rotation signal is transmitted from the central processing unit 16 to the motor drive circuit 17, then the motor 18 is driven in the reverse rotation direction. As the motor 18 is driven, the lead screw 64 is rotated to thereby move the nut 56 downward. Then, with the downward movement of the nut 56, the links 54 are rotated counter-clockwise together with the shaft 46 to thereby rotate the headrest 20 counter-clockwise from the FIG. 3 position and move it forward and down to the storage position of FIG. 2. As a result of this, the headrest 20, as shown in FIG. 3, is moved out of the backward visual field line 37 of the driver where it is stored.

Figure 3:
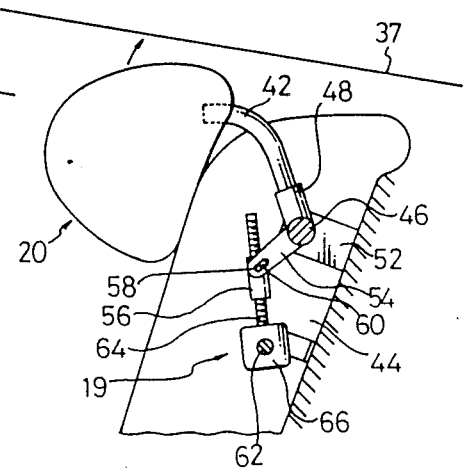
FIG. 3 is a section view of a headrest in its storage position, which is similar to FIG. 2.

Also, in the storage position of the headrest shown in FIG. 3, if the forward rotation signal is transmitted from the central processing unit 16 to the motor drive circuit 17, then the motor 18 is driven in the forward rotation direction. And, as the motor 18 is driven, the lead screw 64 is rotated to thereby move the nut 56 upward. With the upward movement of the nut 56, the links 54 are rotated clockwise together with the shaft 46 to thereby rotate the headrest 20 clockwise as viewed in FIGS. 2 and 3. The headrest 20 is thus moved up to its support position as shown in FIG. 2 in which the headrest 20 is able to support the head of the occupant.

In addition, there is preferably provided a limit switch 68 (see FIG. 4) which is used to limit the range of movement of the headrest 20 and also to stop the driving of the motor 18 in the respective limit positions of the headrest support and storage positions. As the limit switch 68, a push type of switch for example, can be used and the limit switch 68 is fixed to the bracket 52 and is also connected to the central processing unit 16 (see FIG. 1). Also, there are provided on the end portion of the shaft 46 pressure pins 69a and 69b which are respectively able to press the limit switch 68 in the respective limit positions of the support and storage positions of the headrest 20.

The limit switch 68 is arranged to be normally on, that is the limit switch 68 can be turned off if it is pressed by the pressure pins 69a, 69b. In other words, the headrest 20 is able to move while the limit switch 68 is on; if the headrest 20 is moved to either of the limit positions thereof, then the limit switch 68 is pressed by the pressure pins 69a, 69b and is thus turned off, and a signal indicating the "off" position of the limit switch is transmitted to the central processing unit 16. Responsive to this, the central processing unit 16 transmits a stop signal to the motor drive circuit 17 to thereby stop the driving of the motor 18 immediately, so that the excessive movement of the headrest 20 can be prevented. However, the limit switch 68 is not always limited to the push type switch employed in the above-mentioned embodiment, but the limit switch 68 may be formed of a switch of another type.

It should be noted here that the above-mentioned structure of the headrest 20 is only an example and the invention is not limited to the illustrated structure. For example, the shaft 46 may be divided into two right and left sections and there may be provided two motors 18, two pairs of links 54, two nuts 56 and two gear boxes 66 respectively, so that the right and left headrests may be controlled individually.

Figure 5:
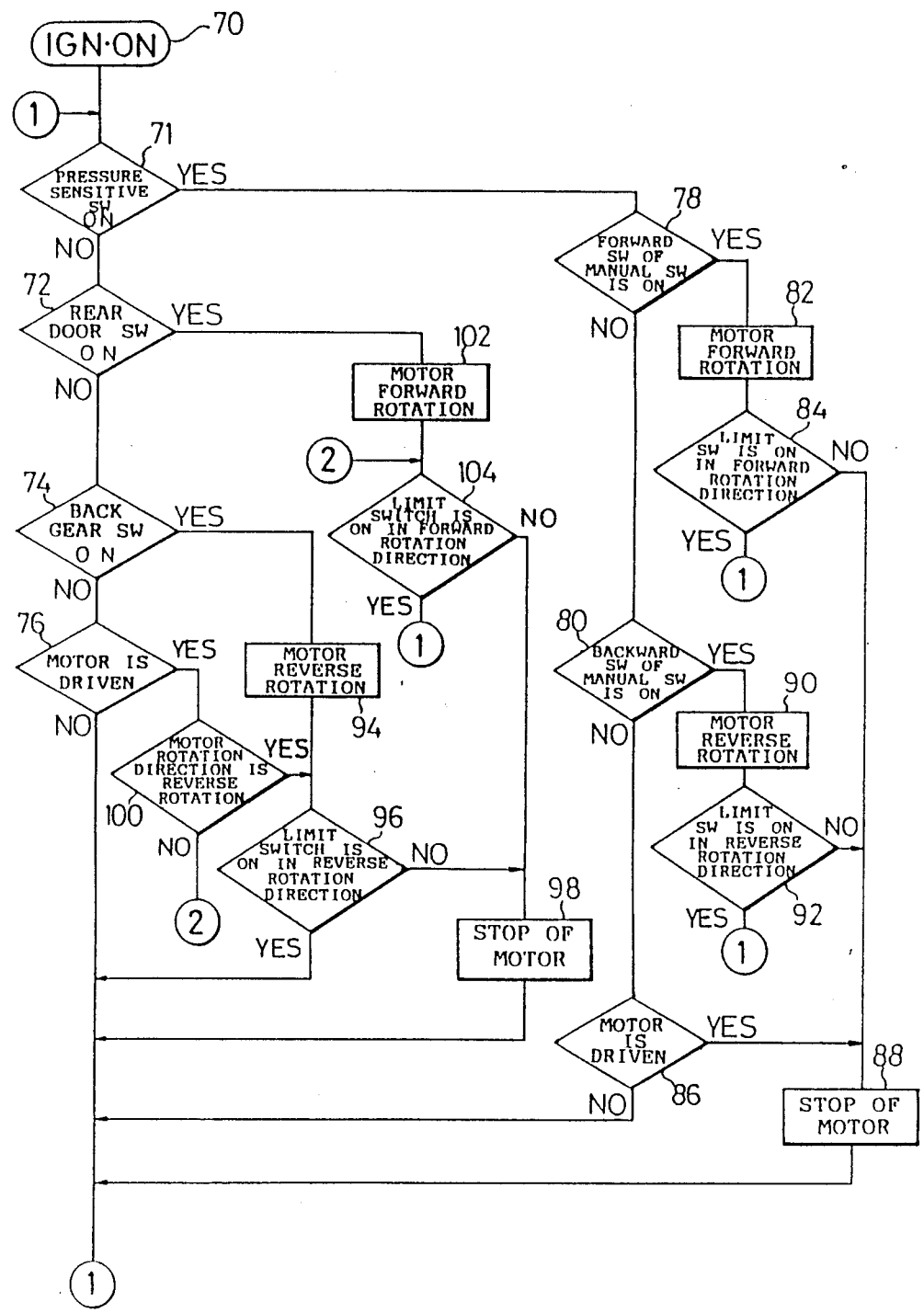
FIG. 5 is a flow chart of a headrest control system linked with shifting to reverse.

Now, description will be given below in detail of the headrest control system by use of the above-structured headrest control device 10 with reference to a flow chart shown in FIG. 5. At first, a main switch of the headrest control device 10 is turned on. Normally, the ignition switch 27 doubles as the above-mentioned main switch. When the driver sits down in the driver's seat and turns on the ignition switch 27, the main switch for the rear seat headrest control is also turned on automatically (70). Then, the microcomputer checks whether the pressure sensitive switch 30 of the sitting detection means is on or not (71), whether the rear door switch of the door position sensing means 36 is on or not (72), and whether the reverse gear switch of the reverse gear detection means 12 is on or not (74). Here, if it is assumed that the shift lever 22 is in its neutral position and that no occupant is seated in the rear seat, then all of them are signalled "NO". Also whether the headrest motor 18 is driven or not (76) is checked and, of course, it is decided as "NO" so the headrest stays in the storage position.

When the rear seat passenger sits down in the rear seat 28, then the pressure sensitive switch 30 of the sitting detection means detects the pressure thereof and turns on. Thus, because the pressure sensitive switch 30 is on, in (71) "YES" is decided. Then, whether the forward movement switch of the manual switch 38 is on or not (78) and whether the backward movement switch of the manual switch 38 is on or not (80) are checked respectively. Here, for example, if it is assumed that the forward movement switch of the manual switch 38 is on, then in (78) "YES" is decided so that the motor 18 is driven in the forward rotation direction (82). Then, whether the limit switch 68 is on or not (84) is checked and, until the limit switch 68 is turned off and thus "NO" is decided, the motor 18 is continuously driven in the forward rotation.

If it is assumed that the forward movement switch of the manual switch 38 is off at an arbitrary position, then in (78) "NO" is decided and, further, whether the backward movement switch of the manual switch 38 is on or not is checked (80). In this case, since the backward movement switch is off, "NO" is decided. And, it is checked whether or not the motor 18 is driven (86). In this case, since the motor 18 is driven, in (86) "YES" is decided, thereby causing the motor 18 to stop (88). Also, while the driving of the motor 18 in the forward rotation is being continued, if the limit switch 68 is assumed to be off in the forward rotation direction, then in (84) "NO" is decided, thereby causing the motor 18 to stop (88).

Further, in a state in which in (78) "NO" is decided, if the backward movement switch of the manual switch 38 is assumed to be on, then in (80) "YES" is decided, so that the motor 18 is driven in the reverse rotation (90) until the limit switch 68 is assumed to be off in the reverse rotation direction and thus "NO" is decided (92). And, if the backward movement switch of the manual switch 38 is arbitrarily assumed to be off, or, if "NO" is decided in (92), then the motor 18 is caused to stop (88).

When no passenger is seated in the rear seat and the rear door 34 is closed, that is, in a state in which wherein (71) and (72) "NO" is decided and if the shift lever 22 is changed to the reverse gear, then the reverse gear switch of the reverse gear detection means 12 is turned on and, in (74), "YES" is decided. And, the motor 18 is driven in the reverse rotation (94) and then whether the limit switch 68 is on or not in the reverse rotation direction (96) is checked. If in (96) "YES" is decided, then the motor 18 is driven continuously until the limit switch 68 is turned off. And, if the limit switch 68 is turned off in the reverse rotation direction, then in (96) "NO" is decided, thereby stopping the driving of the motor 18 (98).

Here, for example, while the motor 18 is being driven in the reverse rotation, if the shift lever 22 is changed from the reverse gear to another gear and thus the reverse gear switch is considered to be off, then in (74) "NO" is decided. And, in (76) "YES" is decided and whether the rotation direction of the motor 18 is the reverse direction or not (100) is checked. If in (100) "YES" is decided, then the driving of the motor 18 in the reverse rotation is continued until in (96) the limit switch 68 is considered to be off and thus "NO" is decided.

As described above, according to the invention, when the pressure sensitive switch 30 of the sitting detection means is assumed or considered to be off and in (71) "NO" is decided, whether the reverse gear switch of the reverse gear detection means 12 is on or not is checked in (74). In other words, when the occupant is seated in the rear seat 28, even if the gear shift lever 22 is changed to the reverse gear, the headrest 20 remains in its support position and is not moved to the storage position. There is thus eliminated the possibility that the headrest may be stored regardless of the will or presence of the rear seat occupant. And, while the occupant is seated in the rear seat 28, even if a crash or a sudden stop occurs in backing the car, the headrest 20, in its support position, is able to support the head of the rear seat occupant sufficiently to thereby secure the safety of the occupant.

Also, while the headrest 20 is in its storage position, for example, if the rear door 34 is opened for the occupant to climb into the rear seat, then the rear door switch of the door position sensing means 36 is turned on and thus in (72) "YES" is decided. As a result of this, the motor 18 is driven in the forward rotation (102) and whether the limit switch 68 is on or not in the forward rotation (104) is checked. And, until in (104) "NO" is decided, the driving of the motor 18 is continued, and, when "NO" is decided in (104), then the motor 18 is caused to stop (98). In this manner, if the rear door 34 is opened, then the headrest 20 in its storage position is automatically returned to its support position. Thanks to this, the prospective rear seat passenger is able to climb into the rear seat easily without being hampered by the headrest 20.

As described above, according to the headrest control system of the invention, the presence or absence of the occupant in the rear seat 28 is detected by the sitting detection means 14 and responsive to such detection, the headrest 20 is to be stored. In other words, if the occupant is present in the rear seat 28, then the headrest 20 remains in the support position thereof and only when no occupant is present in the rear seat is the headrest 20 stored below the backward visual field line of the driver to thereby secure the backward visual field of the driver. Thanks to this, in backing the car, even if a crash or a sudden stop occurs, the headrest 20 is sure to support the head of the occupant in the rear seat sufficiently. Also, even if the shift lever 22 is changed to the reverse gear, since the headrest 20 remains in the support position thereof, the headrest 20 provides no obstacle to the rear seat occupant when the occupant climbs out of the rear seat.

Also, there is arranged the door position sensing means 36 in the rear door 34. Thanks to this, even while the headrest 20 is stored in its storage position, the headrest 20 can be returned from its storage position to its support position simultaneously when the rear door 34 is opened, so that the headrest 20 provides no obstacle to the occupant when climbing into the rear seat. And, due to the fact, even if the headrest 20 is stored before the occupant is seated in the rear seat, the headrest can be situated always in its support position after the occupant is seated in the rear seat. Moreover, the possibility of moving the headrest from its storage position to its support position is eliminated after the rear seat passenger is seated.

Also, there is provided the manual switch 38 which is able to set arbitrarily the forward and backward positions of the headrest 20. Thanks to this, the occupant in the rear seat 28 can set the support position of the headrest to his or her taste with ease.

In addition, unlike a conventional headrest which is constructed such that it can be moved in a vertical direction, the headrest 20 according to the invention is constructed such that it can be rotated back and forth by the headrest drive mechanism 19. Thanks to this, the headrest 20 can be stored with no need for formation of a recess in the upper end portion of the seat back 44, which improves the quality of the outer appearance of the seat.

In the illustrated embodiment, the car is of the four door type. However, this is not always limitative, but alternatively for example, the headrest 20 according to the invention may be mounted to the rear seat of a two door type of car and the headrest 20 may be controlled by the headrest control device 10. In this case, the door position sensing means 36 is omitted. Also, the transmission 21 may be of a manual type or of an automatic type.

It is to be understood that the illustrated embodiment is for illustration of the invention and the invention is not limited to the embodiment. Also, it is to be understood that all of various changes and modifications may be made within the spirit and scope of the invention without departing from the invention.

As has been described above, in the headrest control device using a headrest control system in linkage with shifting to the reverse gear according to the invention, the presence or absence of an occupant in the rear seat is detected by use of the sitting detection means and, responsive to such detection, the headrest can be stored. In other words, if the occupant is present in the rear seat, then the headrest remains in the support position thereof and, only for the absence of the occupant in the rear seat, the headrest is to be stored. Thanks to this, even if a crash or a sudden stop occurs in backing the car, the headrest can support the head of the occupant sufficiently. Also, according to the invention, due to the fact that the headrest remains in the support position thereof even when the shift lever is changed to the reverse gear, the headrest does not prevent the occupant from climbing down from the rear seat.

Further, according to the invention, there is provided the door position sensing means in the rear door. Thanks to this, even when stored, the headrest can be returned from its storage position back to its support position and, therefore, the headrest does not prevent the occupant from climbing into the rear seat. And, even if the headrest is situated in the storage position before sitting of the occupant, the headrest is always situated in the support position when sitting and, therefore, there is eliminated the need to move the headrest from the storage position to the support position after sitting.

Moreover, according to the invention, there is provided the manual switch which is capable of setting arbitrarily the forward and backward positions of the headrest, which allows the occupant of the rear seat to set the position of the headrest to his or her taste with ease.

In addition, the headrest is constructed such that it can be rotated back and forth by the headrest drive device according to the invention. Thanks to this, the headrest can be stored with no need for formation of a recess in the upper end portion of the seat back, which can improve the quality of the outer appearance of the seat.

What is claimed is:

1. A method for use with an automotive rear seat having an upwardly projecting headrest, and a headrest control device comprising a headrest control system in linkage with a gear change, said method comprising the steps of:
    detecting the absence of an occupant in said rear seat; and, when absence is detected and upon shifting gears to reverse, rotating forwardly and downwardly said headrest of said rear seat from an upright head support position to a storage position below the backward visual field line of a driver to thereby secure the backward visual field of said driver in backing a car; and
    detecting the opening of a rear door; and, when said rear door is opened, returning said headrest from the storage position thereof to the head support position thereof.

2. A headrest control device in linkage with gear shift means for use with an automotive seat, comprising:
    a headrest disposed in the upper end portion of a seat back of a rear seat and rotatable between a support position for supporting the head of a rear seat passenger and a storage position situated below a backward field of view line of a driver;
    a motor for rotating said headrest;
    a motor drive circuit for driving said motor;
    sitting detection means for detecting the presence or absence of a passenger in said rear seat;
    reverse gear detection means for detecting the shifting of gears to reverse;
    a central processing unit for processing information transmitted thereto from said sitting detection means and said reverse gear detection means in accordance with a predetermined program and for transmitting a control signal to said motor drive circuit to thereby control the driving of said motor so that in the absence of detection of a rear seat passenger by said sitting detection means and upon shifting to reverse as detected by said reverse gear detection means, then said motor is driven to thereby rotate said headrest from said support position to said storage position; and
    a door opening detection means for detecting the opening of a rear door and for transmitting a detection signal to said central processing unit so that said central processing unit, on receiving said detection signal from said door opening detection means, transmits to said motor drive circuit a signal for rotating said headrest from said storage position to said support position, thereby driving said motor.

3. A headrest control device as set forth in claim 2, further including:

a limit switch for limiting the range of movements of said headrest; and a manual switch for transmitting a signal to said motor drive circuit to drive said motor to thereby rotate said headrest to an arbitrary position.

4. A headrest control device as set forth in claim 2, further comprising means present in the rear seat for manually rotating said headrest to a desired support position to the taste of said rear seat passenger.

5. A headrest control device as set forth in claim 2, further comprising electrical switch means present in the rear seat for controlling rotation of said headrest to a desired support position to the taste of said rear seat passenger.

* * * * *